(12) United States Patent
Wisener et al.

(10) Patent No.: US 7,706,375 B2
(45) Date of Patent: Apr. 27, 2010

(54) SYSTEM AND METHOD OF FAST ADAPTIVE TCAM SORTING FOR IP LONGEST PREFIX MATCHING

(75) Inventors: James Wisener, Ottawa (CA); Adrian Grah, Kanata (CA)

(73) Assignee: Alcatel Lucent, Paris (FR)

( * ) Notice: Subject to any disclaimer, the term of this patent is extended or adjusted under 35 U.S.C. 154(b) by 545 days.

(21) Appl. No.: 11/702,554

(22) Filed: Feb. 6, 2007

(65) Prior Publication Data

US 2008/0186970 A1 Aug. 7, 2008

(51) Int. Cl.
*H04L 12/28* (2006.01)
*H04L 12/56* (2006.01)
*G06F 15/173* (2006.01)

(52) U.S. Cl. ............... 370/392; 370/395; 370/401; 709/238

(58) Field of Classification Search ......... 370/255–351, 370/378–389, 392–395, 400–408; 709/238–241; 711/108–158
See application file for complete search history.

(56) References Cited

U.S. PATENT DOCUMENTS

| | | | | |
|---|---|---|---|---|
| 6,237,061 B1 * | 5/2001 | Srinivasan et al. | ......... | 711/108 |
| 6,516,383 B1 * | 2/2003 | Patra et al. | ................... | 711/108 |
| 6,633,548 B2 * | 10/2003 | Bachmutsky et al. | ........ | 370/255 |
| 6,954,463 B1 * | 10/2005 | Ma et al. | ..................... | 370/401 |
| 7,028,098 B2 * | 4/2006 | Mate et al. | .................. | 709/238 |
| 7,356,033 B2 * | 4/2008 | Basu et al. | .................. | 370/392 |
| 2008/0080539 A1 * | 4/2008 | Hong et al. | ................. | 370/402 |

OTHER PUBLICATIONS

Shah, Devavrat and Gupta, Pankaj, Fast Updating Algorithms for TCAMs, IEEE MICRO, Jan.-Feb. 2001, pp. 36-47, Stanford University.

* cited by examiner

*Primary Examiner*—Man Phan
(74) *Attorney, Agent, or Firm*—Kramer & Amado P.C.

(57) ABSTRACT

A system and method are provided for sorting IP routing table entries in a TCAM for longest IP prefix matching LPM of destination IP addresses. The IP routing table is divided into logical blocks, for each block an associated routing entry IP prefix length. Each block is of a respective size whose proportion of the total size of the routing table is determined by the associated IP prefix length. The blocks are ordered so that the TCAM returns an LPM when queried. Starting block sizes can be initialized to proportions which reflect actual expected numbers by proportion of routing entries by IP prefix length. The blocks also grow and shrink as entries are added and deleted so as to more closely mirror real-world populations of expected entries having the IP prefix length in question.

21 Claims, 10 Drawing Sheets

| PREFIX LENGTH | PERCENTAGE OF ROUTING ENTRIES |
| --- | --- |
| /0 TO /7 | 0.00 % |
| /8 | 0.01 % |
| /9 | 0.00 % |
| /10 | 0.01 % |
| /11 | 0.01 % |
| /12 | 0.04 % |
| /13 | 0.08 % |
| /14 | 0.20 % |
| /15 | 0.37 % |
| /16 | 6.22 % |
| /17 | 1.30 % |
| /18 | 2.33 % |
| /19 | 6.76 % |
| /20 | 6.46 % |
| /21 | 4.59 % |
| /22 | 7.03 % |
| /23 | 8.46 % |
| /24 | 55.59 % |
| /25 | 0.03 % |
| /26 | 0.04 % |
| /27 | 0.05 % |
| /28 | 0.07 % |
| /29 | 0.04 % |
| /30 | 0.26 % |
| /31 | 0.00 % |
| /32 | 0.05 % |

FIG. 10

SYSTEM AND METHOD OF FAST ADAPTIVE TCAM SORTING FOR IP LONGEST PREFIX MATCHING

FIELD OF THE INVENTION

The invention relates to TCAM entry sorting and more particularly to sorting IP packet forwarding entries in a TCAM for efficient IP routing.

BACKGROUND OF THE INVENTION

In IP routing devices of an IP communications network, an IP packet is forwarded based on the destination IP address specified in the IP packet. In order to more efficiently manage routing of IP packets, classless inter-domain routing (CIDR) is performed based on a portion of the destination IP address which is typically a prefix having a bit length smaller than the total bit length of the destination IP address. Often, groups of IP packets with identical prefixes are forwarded together over the same destination port by using a routing table with summary IP addresses. A summary IP address specifies a prefix having a particular length which is used to route IP packets. For example a router may contain a table having a summary IP address determining the routing of IP packets having IP destination addresses which have identical 24-bit long prefixes of "138.120.52". The summary IP address in the routing device table is denoted as 138.120.52.0/24, where the /24 indicates that this routing entry only applies to the first 24-bits of the destination IP address and the last "0" is merely a place-marker. If more than one summary IP address routing entry applies to an IP packet, for example 138.120.52.0/24 and 138.120.52.78/32, the IP packet is routed based on the summary IP address having the longest prefix of the matched IP packet. As such, an IP packet is said to be routed based on the longest prefix match (LPM) between the IP destination address of the IP packet and the summary IP addresses in the routing table. Due to the format of IP addresses, the longest prefix match corresponds to the most specific routing of the IP packets.

In hardware, a destination port lookup or routing lookup may be performed with use of a TCAM (ternary content addressable memory).

Content addressable memory (CAM) provides for an operation inverse to that of standard address access memory. Instead of returning data content from an address in the memory when passed the memory address, the CAM returns a particular memory address when passed the content data which matches content stored in the CAM at that memory address. If more than one address in the CAM contains the same data as that passed to it, that is if there is more than one entry in the CAM which matches the passed content data, the CAM will return a single address of a matching entry depending upon the algorithm performed by the CAM. The fastest CAMs either always return the lowest address of the entries which match the data or always return the highest address of the entries which match the data.

Ternary content addressable memory allows for the entry stored at each address in the TCAM to include data comprising 1s, 0s, and a third "don't care" value at each "bit" position. When data passed to the TCAM matches an entry at all bit positions of that entry having 1s and 0s, the TCAM will treat this as a complete match regardless of the bits of the data passed in the bit positions corresponding to the "don't care value" bit positions of the TCAM entry. In a TCAM, when there are multiple-matches, an arbiter of the TCAM returns a single TCAM address according to a fixed algorithm. For the purpose of IP forwarding, the TCAM is populated with summary IP address entries corresponding to destination IP addresses at TCAM addresses which are used to determine to which port a packet having that destination IP address is to be forwarded. TCAMs are ideal for use with summary IP addresses because of their ability to handle summary or partial data, which in this application are the prefixes of IP addresses used for routing. To be used effectively in routing IP packets, a summary IP address is stored in a TCAM in a manner such that the bits of an IP address not specified by the summary IP address are filled with "don't care" values in the TCAM entry. In order to ensure proper forwarding of IP packets which have different prefix lengths but identical specified bit values, the entries in the TCAM must be arranged so that depending upon the multiple matching algorithm of the arbiter of the TCAM, the TCAM address corresponding to the LPM is returned. This is achieved in fast TCAMs by having the summary IP address having the longest prefix either above or below the summary IP address having the smaller prefix so that the TCAM address of the summary IP address with the longest prefix is returned.

In general the particular application a TCAM is to be used for will dictate the type of sorting required. TCAM vendors often provide software sorters or table managers in a software support package bundled with their TCAMs. In the case of TCAMs used in IP routing, the TCAM sorting software provided typically sorts the TCAM so that the LPM is returned when the TCAM is passed a destination IP address. In general a sorter or table manager may be implemented in software or hardware to sort the TCAM according to the particular application for which it is used.

It should be understood that no matter what method is used to sort IP routing entries in a TCAM, it is always desirable to perform as few sorting operations or moves (such as add, delete, and shift) as possible. A few main reasons for this is that sorting operations in the TCAM can reduce the real time search bandwidth available for high data rate packet flow, and that the sorter or table manager performing the sorting operations on the TCAM require CPU resources.

FIG. 1 shows an example known TCAM 10 used for IP routing having M TCAM entries and which returns the lowest TCAM address in the case of a multiple match. The routing entries of the TCAM 10 are sorted according to a simple known method of sorting summary IP addresses in a TCAM for IP routing, namely, all routing entries are sorted in the TCAM 10 in order of prefix length. Starting at TCAM address 0, all summary IP addresses having 32-bit prefixes 2 are stored at the top of the table, next summary IP addresses having 31-bit prefixes 4, and so on down to summary IP addresses having 8-bit prefixes 6, ending at entry M−1. In FIG. 1, 7-bit prefixes and lower are not shown since prefixes of these lengths are not typically used in known routing tables with the exception of the default route or the 0.0.0.0/0 entry which is the route chosen when no other route matches. This entry is not shown in the table because this function is typically performed outside of the routing table, and in many applications when an IP packet has no match it is simply dropped. The TCAM 10 of FIG. 1 is shown as having a full routing table which cannot accept any more entries. Sorting in the order of the longest prefix length at the lowest TCAM address to the smallest prefix length at the highest TCAM address ensures that the LPM is always returned.

FIG. 2 depicts known sorting of a TCAM 10 similar to FIG. 1 with the addition of empty TCAM entries referred to as empty space 8, kept at the bottom of the TCAM 10. In this method, whenever a new summary IP address is added to the TCAM 10 at a particular TCAM address, all non-empty TCAM entries below that particular TCAM address are shifted in the TCAM downwards by 1, and whenever a summary IP address is removed from the TCAM 10 at a particular address, all non-empty TCAM entries below that particular address are shifted in the TCAM 10 upwards by 1. In the worst case, in the limit of the TCAM 10 becoming full, the number of moves required to properly sort entries in the TCAM 10 after an addition or deletion of a routing entry, is equal to the number of TCAM entries M of the TCAM 10.

FIG. 3 depicts known sorting of a TCAM 10 similar to that of FIG. 2 with the addition of empty space 8 between groups of non-empty TCAM entries having the same prefix length. As shown, there is empty space 8 between the 32-bit prefix entries 2 and the 31-bit prefix entries 4, between the 31-bit prefix entries 4 and the 30-bit prefix entries (not shown), and so on down to the empty space between the 9-bit prefix entries 7 and the 8-bit prefix entries 6. Whenever a new summary IP address is added to the TCAM 10, it is added to an empty entry adjacent to the group of routing entries having the same prefix bit length as the new summary IP address. If there are no spaces available, a non-empty entry of a neighboring group is shifted to an opposite side of the neighboring group to make an empty entry. At worst, 25 moves (32 minus 7) would have to be made to add a new summary IP address. Whenever a summary IP address is removed from the TCAM 10 from a particular group of routing entries, an entry on the edge of that particular group is moved to the empty space left by the removed summary IP address.

FIG. 4 depicts another known method of sorting a TCAM 10 similar to that of FIG. 1 with the addition of empty space 8 in the middle of the table, between the 21-bit prefix entries 3 and the 20-bit prefix entries 5. Although no spaces are shown between the groups of entries, the TCAM 10 of FIG. 4 having empty space midway in the table may have empty spaces between groups as well. Whether or not the TCAM 10 has spaces throughout, having a large empty space in the middle of the TCAM 10 halves the number of worst case moves required by dividing the problem in two. The sorting of entries above the space involves utilizing the space below it, while the sorting of entries below the space involves utilizing the space above it.

A more processing intensive variation of the method of sorting of FIG. 4 retains the empty space 8 in the middle of the TCAM 10 but dispenses with ordering groups of summary IP address entries by prefix length. Only summary IP addresses which are related to each other (i.e. have prefixes which are subsets or supersets of each other) need to be ordered in the TCAM 10, and moreover they need only be ordered with respect to each other. Unrelated summary IP addresses need not be ordered with respect to each other regardless of the length of their prefixes. Although this known method works in the sense that once the TCAM 10 is sorted it successfully returns the LPM, this known method involves a significant amount of overhead to keep track of how TCAM entries are related to each other and to ensure that the entries are sorted properly as the table of entries dynamically changes.

Currently, although known solutions succeed in sorting the TCAM entries so that IP packets are forwarded according to the LPM with use of the TCAM, they are deficient in a number of key ways. Many of the known solutions do not scale well to the wider IPv6 (Internet Protocol version 6) addresses which are 128 bits in length compared to IPv4 (Internet Protocol version 4) whose addresses are 32 bits long. Known solutions do not take into account real-world usage of IP networks and the statistical distribution of summary IP addresses normally found in routing devices. Some known solutions are overly complex and make inefficient use of resources and processing. Finally, none of the known solutions are specifically adaptive to the real-world networking and routing conditions that the TCAM is operating within.

SUMMARY OF THE INVENTION

According to one broad aspect the invention provides for a method of managing a routing table of a TCAM for IP longest prefix matching, the method comprising: dividing the routing table into a plurality of logical blocks wherein each logical block is associated with a respective IP prefix length and is for storing respective routing entries having said respective IP prefix length, and wherein each logical block is of a respective size whose proportion to a total size of the routing table is determined by the respective IP prefix length, and wherein said plurality of logical blocks are ordered in said routing table such that the TCAM returns a longest prefix match when passed an IP address.

In some embodiments of the invention said proportion for each respective size of each logical block is determined by the respective IP prefix length, by being initialized to an expected proportion of non-empty routing entries of said IP prefix length to a total number of non-empty routing entries in the routing table during operation.

In some embodiments of the invention said proportion for each respective size of each logical block is determined by the respective IP prefix length, by being changed in accordance with an actual proportion of non-empty routing entries of said IP prefix length to a total number of non-empty routing entries in the routing table during operation.

In some embodiments of the invention adding a routing entry to a logical block of said plurality of logical blocks of said table comprises: inserting the routing entry into the center of the logical block if the logical block is empty; inserting the routing entry into an empty entry adjacent to a used portion of the logical block on a side of the used portion which has a greatest number of empty entries, if the logical block has non-empty entries and empty entries; and growing the logical block into an adjacent empty portion of a neighboring logical block, if the logical block is full, and inserting the routing entry into said adjacent empty portion in an empty entry adjacent to a used portion of the logical block.

In some embodiments of the invention the adjacent empty portion of the neighboring logical block is larger than a second adjacent empty portion, if any, of a second neighboring logical block, if any, and wherein half of said adjacent empty portion is taken by said logical block in said growing of the logical block.

In some embodiments of the invention adding a routing entry to a logical block of said plurality of logical blocks of said table further comprises: if there is no adjacent empty portion in said neighboring logical block before said step of growing, creating said adjacent empty portion by shifting an adjacent neighboring routing entry of said neighboring logical block to a second empty portion of said neighboring logical block.

In some embodiments of the invention said second empty portion of said neighboring logical block is larger than a third empty portion, if any, of a second neighboring logical block, if any.

In some embodiments of the invention adding a routing entry to a logical block of said plurality of logical blocks of said table further comprises: if there is no second empty portion in said neighboring logical block before said step of creating said adjacent empty portion, creating said second empty portion by growing the neighboring logical block into a further adjacent empty portion of a further neighboring logical block.

In some embodiments of the invention deleting a routing entry to be deleted from said logical block of said plurality of logical blocks of said table comprises: copying a non-empty routing entry, from a used portion of said logical block and adjacent to an empty portion of said logical block, over said routing entry to be deleted; and clearing said non-empty routing entry creating an empty entry.

In some embodiments of the invention the empty portion of said logical block is larger than a second empty portion, if any, of said logical block.

According to another broad aspect the invention provides for a system for routing IP packets according to longest IP prefix matching, the system comprising: a TCAM having a routing table for longest IP prefix matching; and a table manager for dividing the routing table into a plurality of logical blocks wherein each logical block is associated with a respective IP prefix length and is for storing respective routing entries having said respective IP prefix length, and wherein each logical block is of a respective size whose proportion to a total size of the routing table is determined by the respective IP prefix length, wherein said plurality of logical blocks are ordered in said routing table such that the TCAM returns a longest IP prefix match when passed an IP address.

In some embodiments of the invention said proportion for each respective size of each logical block is determined by the respective IP prefix length, by being initialized by said table manager to an expected proportion of non-empty routing entries of said IP prefix length to a total number of non-empty routing entries in the routing table during operation.

In some embodiments of the invention said proportion for each respective size of each logical block is determined by the respective IP prefix length, by being changed by said table manager in accordance with an actual proportion of non-empty routing entries of said IP prefix length to a total number of non-empty routing entries in the routing table during operation.

In some embodiments of the invention the table manager is further for adding a routing entry to a logical block of said plurality of logical blocks of said table by: inserting the routing entry into the center of the logical block if the logical block is empty; inserting the routing entry into an empty entry adjacent to a used portion of the logical block on a side of the used portion which has a greatest number of empty entries, if the logical block has non-empty entries and empty entries; and growing the logical block into an adjacent empty portion of a neighboring logical block, if the logical block is full, and inserting the routing entry into said adjacent empty portion in an empty entry adjacent to a used portion of the logical block.

In some embodiments of the invention said table manager is further for adding a routing entry to a logical block of said plurality of logical blocks of said table by: if there is no adjacent empty portion in said neighboring logical block before said step of growing, creating said adjacent empty portion by shifting an adjacent neighboring routing entry of said neighboring logical block to a second empty portion of said neighboring logical block.

In some embodiments of the invention said table manager is further for adding a routing entry to a logical block of said plurality of logical blocks of said table by: if there is no second empty portion in said neighboring logical block before said step of creating said adjacent empty portion, creating said second empty portion by growing the neighboring logical block into a further adjacent empty portion of a further neighboring logical block.

In some embodiments of the invention said table manager is for deleting a routing entry to be deleted from said logical block of said plurality of logical blocks of said table by: copying a non-empty routing entry, from a used portion of said logical block and adjacent to an empty portion of said logical block, over said routing entry to be deleted; and clearing said non-empty routing entry creating an empty entry.

In some embodiments of the invention each logical block associated with a small IP prefix length has an initial size of two to the power of the prefix length.

In some embodiments of the invention logical blocks associated with medium IP prefix lengths have a majority of entries.

In some embodiments of the invention the IP packets are IPv4 packets, and an expected proportion of non-empty routing entries having an IP prefix length of 24 to a total number of non-empty routing entries in the routing table during operation is greater than 50 percent.

BRIEF DESCRIPTION OF THE DRAWINGS

The features and advantages of the invention will become more apparent from the following detailed description of the preferred embodiments with reference to the attached figures, wherein:

FIG. 10 is a table illustrating an exemplary starting configuration according to the fast adaptive sorting of a routing table in a TCAM of the preferred embodiment of the invention;

It is noted that in the attached figures, like features bear similar labels.

DETAILED DESCRIPTION OF THE PREFERRED EMBODIMENTS

A method of fast adaptive TCAM sorting according to the preferred embodiment of the invention is now described with reference to FIG. 5.

Figure 1:
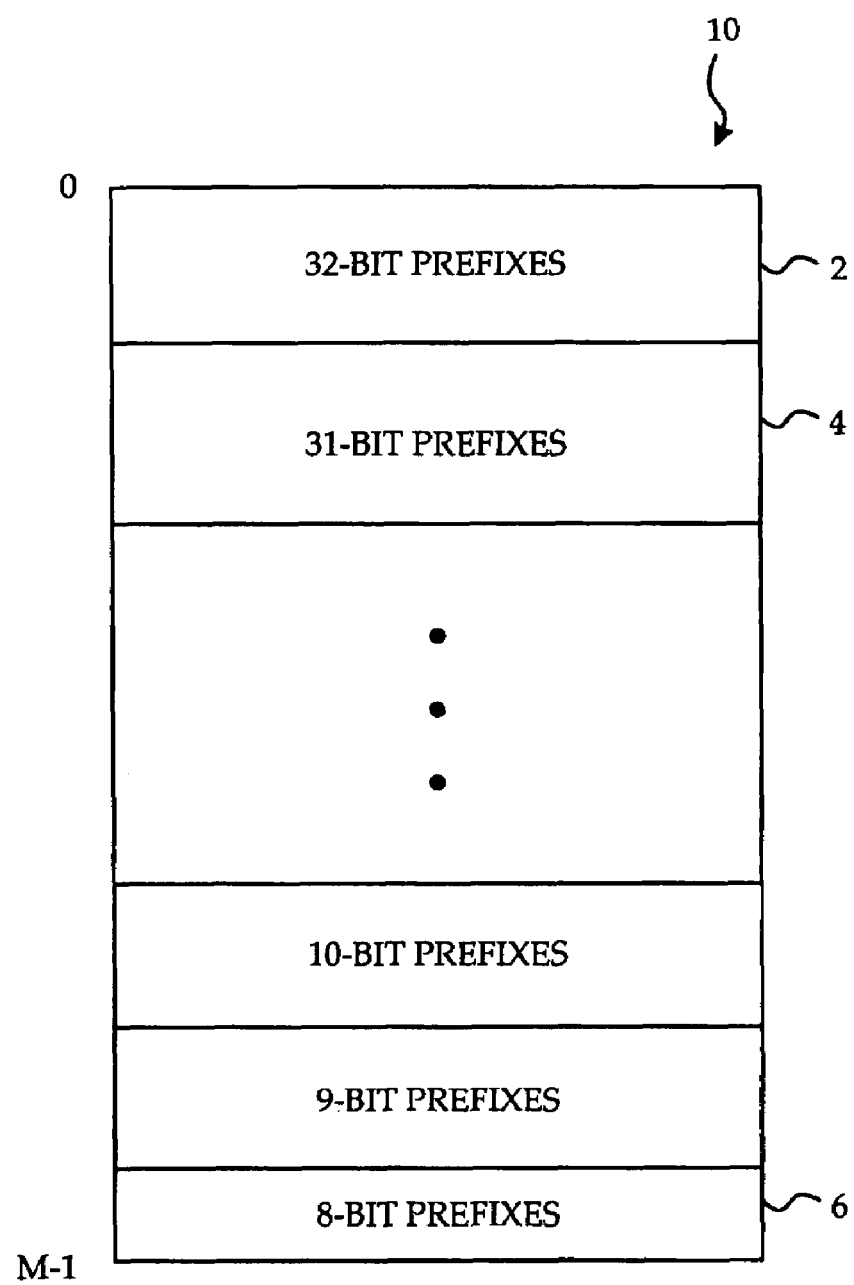
FIG. 1 is a block diagram illustrating known general sorting a routing table in a TCAM.
Figure 2:
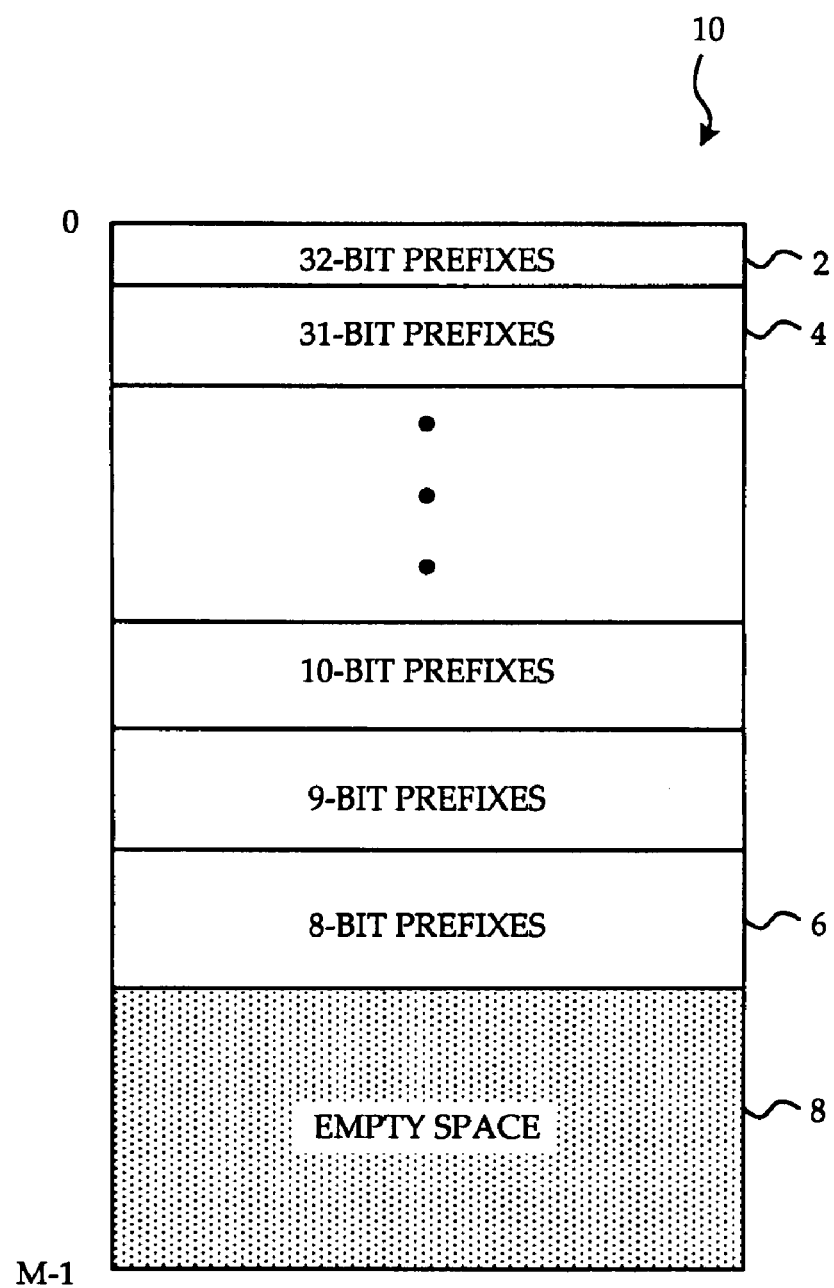
FIG. 2 is a block diagram illustrating a first known type of sorting a routing table in a TCAM.
Figure 3:
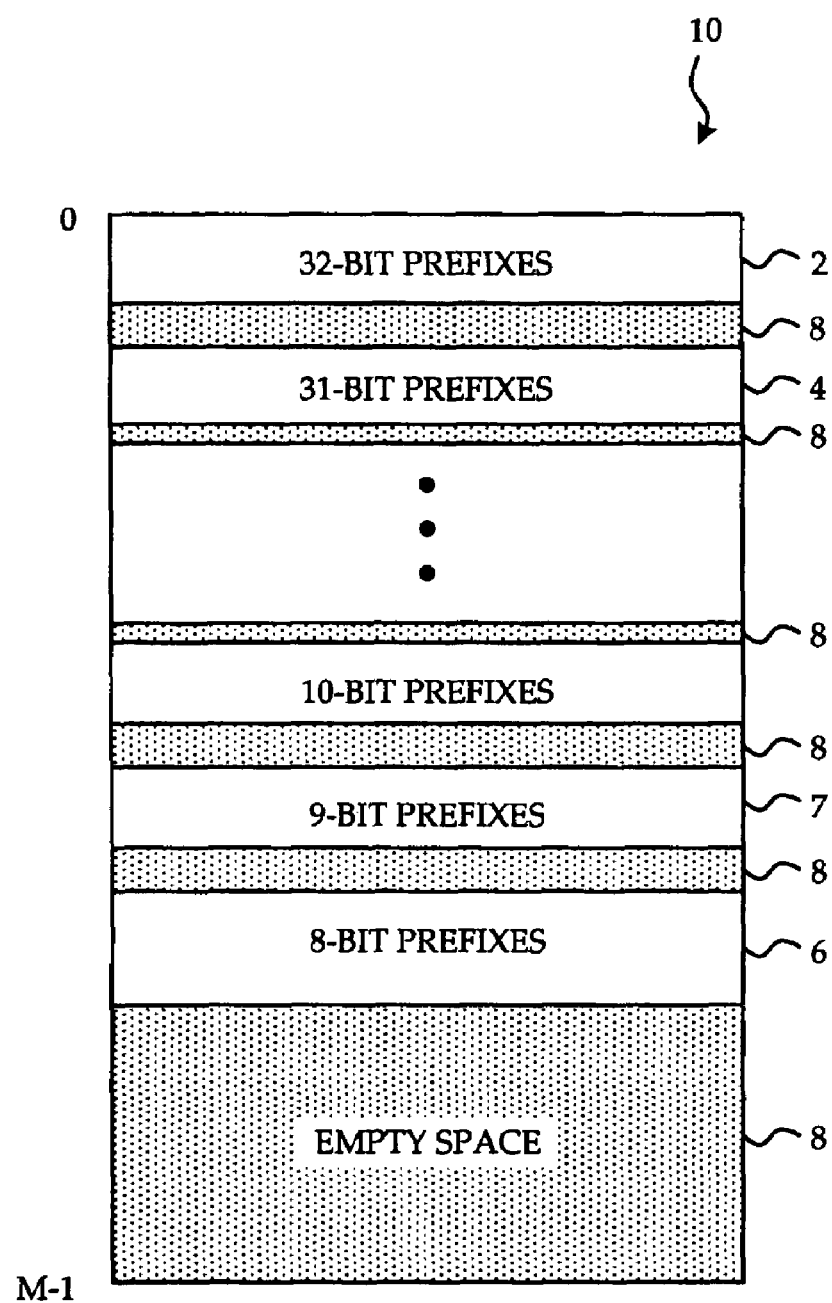
FIG. 3 is a block diagram illustrating a second known type of sorting a routing table in a TCAM.
Figure 4:
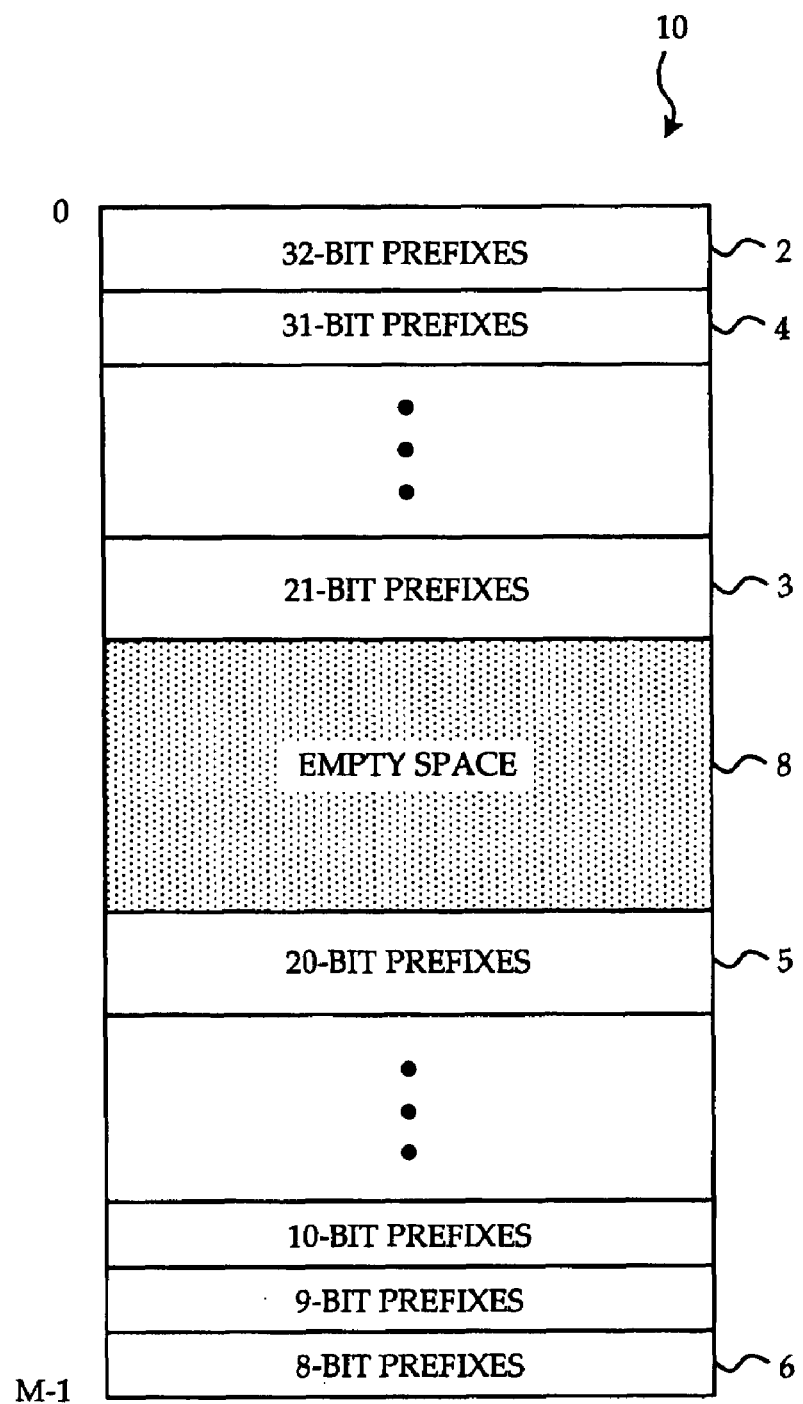
FIG. 4 is a block diagram illustrating a third known type of sorting a routing table in a TCAM.
Figure 5:
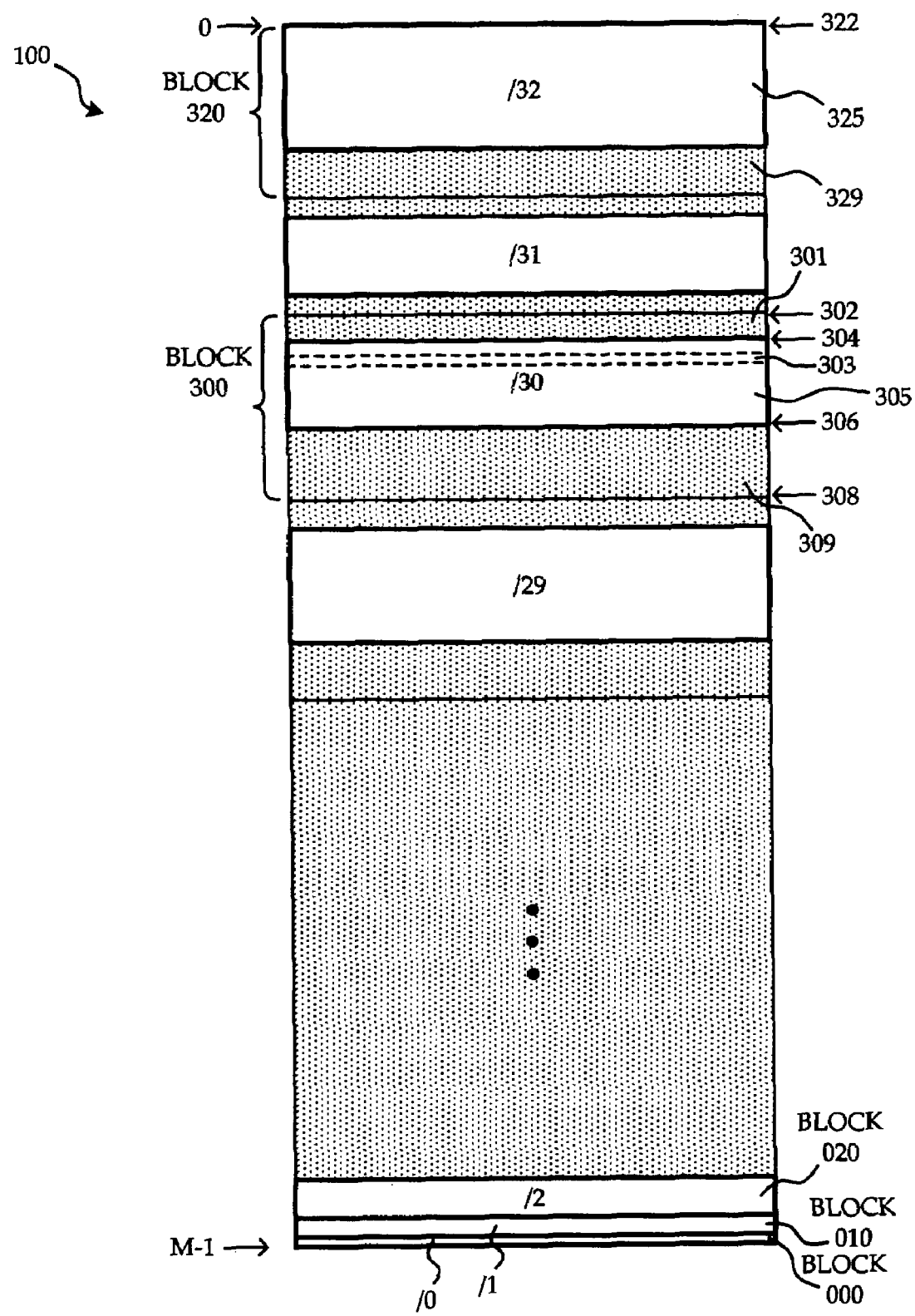
FIG. 5 is a block diagram illustrating a configuration according to the fast adaptive sorting of a routing table in a TCAM of the preferred embodiment of the invention.

A TCAM 100 depicted in FIG. 5 is for use in IP routing and has a routing table which is divided into logical blocks of summary IP addresses. The division of the routing table of the TCAM 100 into logical blocks is such that there is one block for each possible prefix length. The TCAM 100 of FIG. 5 is for IPv4 packets hence the routing table is divided into 33 logical blocks. For IP packets according to IPv6, a routing table of a TCAM would have 129 logical blocks. According to the preferred embodiment of the invention, the size of each of these blocks is preferably initialized to a size according to real-world statistics which reflect expected numbers of routing entries that block will have, based on prefix length. For some logical blocks, the size will be set primarily based on the maximum possible number of routing entries that block may have. For example, only one forwarding entry can have a prefix length of 0, that entry would contain a series of 32 "don't care values" and would be used to route all IP packets that are not routed by any other routing entry in the table. In the preferred embodiment blocks for 0, 1, 2, 3, 4, 5, 6, 7, and 8-bit long prefixes are initialized to sizes equal to the maximum possible number of routing entries which may be present. As discussed below, in the preferred embodiment, even if the TCAM entries are initialized in a manner which for one reason or another does not quite match real-world numbers of routing entries, as entries are added and deleted, the size of the blocks will tend toward sizes which match expected numbers of routing entries of various prefix lengths.

Address 0 is indicated at the top of the TCAM 100 and is the beginning of the block 320 which is for storage of 32-bit prefix entries. The last entry of the routing table is the single routing entry having a 0-bit prefix and is the block 000. The 1-bit prefix block 010, and the 2-bit prefix block 020 are also shown.

The structure of each block other than the block for the largest prefix (which here is the 32-bit prefix block 320) and other than the block for the smallest prefix (which here is the 0-bit prefix block 000) will be discussed by way of an example block, namely the 30-bit prefix block 300 for 30-bit prefixes.

The 30-bit prefix block 300 will be referred to as the /30 block. In general for any N-bit prefix block, the term "N-bit prefix block" and "/N block" will be used interchangeably. The /30 block 300 spans entries in the TCAM 100 from a minimum TCAM entry 302 of the /30 block 300 to a maximum TCAM entry 308 of the /30 block 300. Starting with an empty /30 block 300, non-empty entries are added to the /30 block 300 starting in the centre of the /30 block 300.

The /30 block 300 of FIG. 5 is shown as already having non-empty entries, which form a used portion 305 located in the middle of the /30 block 300. A lower empty portion 301 has empty entries occupying TCAM addresses lower than the used portion 305, while an upper empty portion 309 has empty entries occupying TCAM addresses higher than the used portion 305. The used portion 305 spans entries occupied in the TCAM 100 from the lowest non-empty entry 304 to the highest non-empty entry 306. A single example entry 303 is shown in the FIG. 5 inside the used portion 305 of the /30 block 300. The non-empty entries in the used portion 305 need not be sorted in any particular order with respect to each other. The smallest size of any block is 1.

To keep the TCAM entries sorted a number of operations must be performed including "insert", "delete", and "shift". Ideally entries are operated on as few times as possible to conserve resources and processing. The example TCAM 100 according to the preferred embodiment utilizes a simple arbiter which returns the lowest address of a match in the case of multiple-matches.

In the case of adding a new summary IP address to the /30 block 300, the table manager adds the summary IP address to a TCAM entry just adjacent to the used portion 305, either into the lower empty portion 301 or into the upper empty portion 309. Which adjacent entry it is added to depends upon which one of the lower and upper empty portions 301, 309 is largest. In FIG. 5 the upper empty portion 309 is the portion which has the largest number of empty entries. Consequently, the new summary IP address is added to the upper empty portion 309, as a new non-empty entry, becoming the highest non-empty entry 306 of the /30 block 300.

The 32-bit prefix block and the 0-bit prefix block are special cases which generally behave the same with some exceptions. One exception is that there is no neighboring block of the 32-bit prefix block having 33-bits. Another exception is that the first entry of the /32 block is populated at TCAM address 0 and its used portion 325 grows from the minimum entry 322 of the /32 block. The 0-bit block is exceptional due to its being restricted always to a size of 1.

By inserting every new entry into the largest empty portion of the block, the used portion grows evenly within the logical block. The used portion of the block grows until the block is full and there are no empty entries left. Once this happens the addition of a summary IP address to the full block requires that an entry be taken from a neighboring block, which is carried out according to one of three possible situations.

Figure 6:
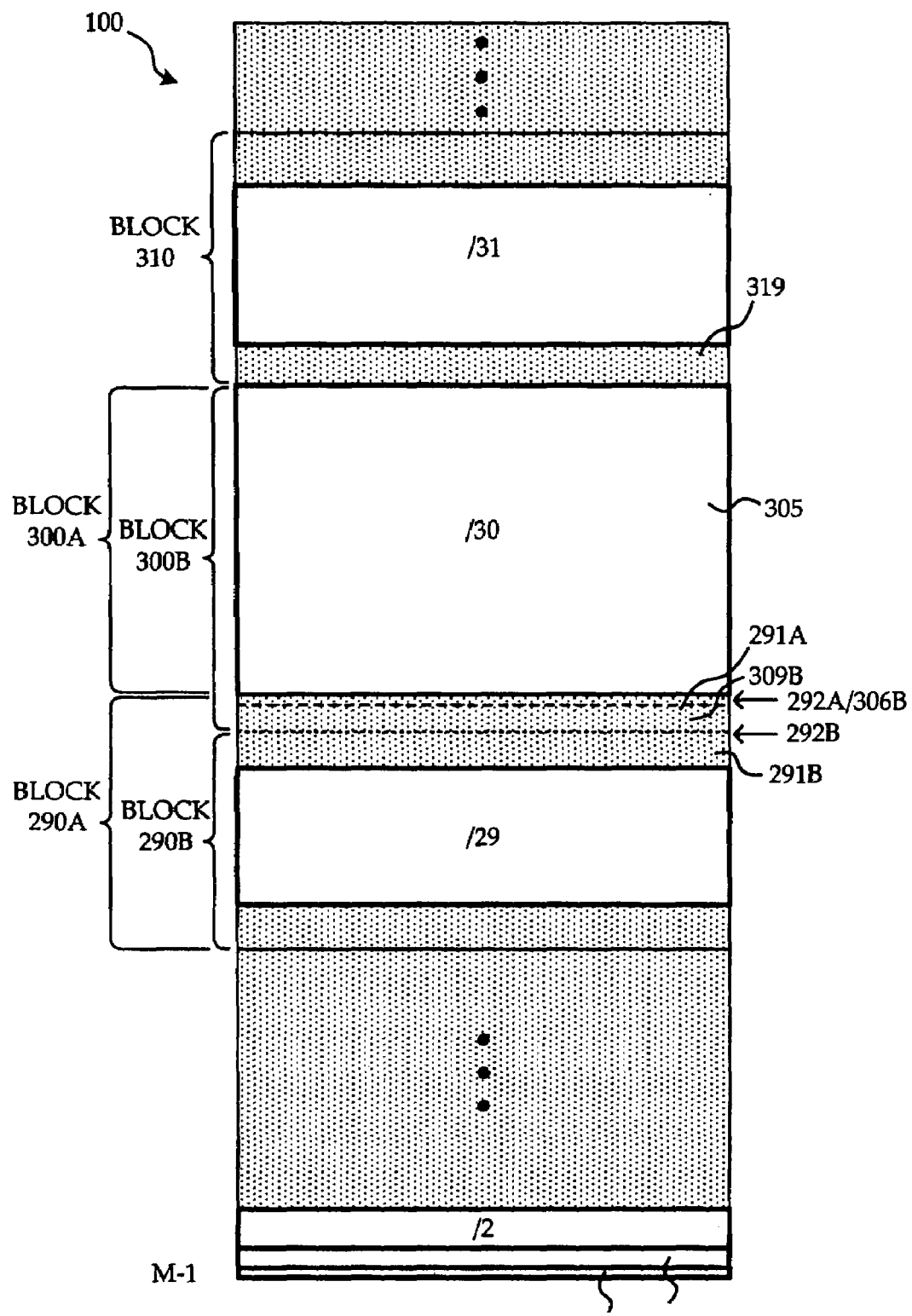
FIG. 6 is a block diagram illustrating an add operation according to the fast adaptive sorting of a routing table in a TCAM of the preferred embodiment of the invention.

A first possible situation occurs when the block into which the entry is to be inserted is full (as depicted in FIG. 6) and there is an area adjacent to the block which is empty. In FIG. 6, a new entry is to be added to the /30 block 300. In FIG. 6, reference numerals followed by an "A" indicate that the item referred to is as it was before the addition of the new entry, while reference numerals followed by a "B" refer to items as they are after the addition of the new entry.

Each of the neighboring blocks, namely the /29 block 290A and the /31 block 310, have empty entries adjacent to the /30 block 300. The upper empty portion 319 of the /31 block 310 is smaller than the lower empty portion 291A of the /29 block 290A. The table manager chooses to insert the new entry into what was the larger of the two empty portions, namely, the lower empty portion 291A. Before inserting the new entry, the table manager takes half of lower empty portion 291A of the /29 block 290A reducing it to lower empty portion 291B having a minimum entry 292B. The new entry is then inserted to become the highest non-empty entry 306B of the used portion 305 of the /30 block 300B. After the insertion, the /30 block 300B has an upper empty portion 309B into which additional insertions may be made.

Figure 7:
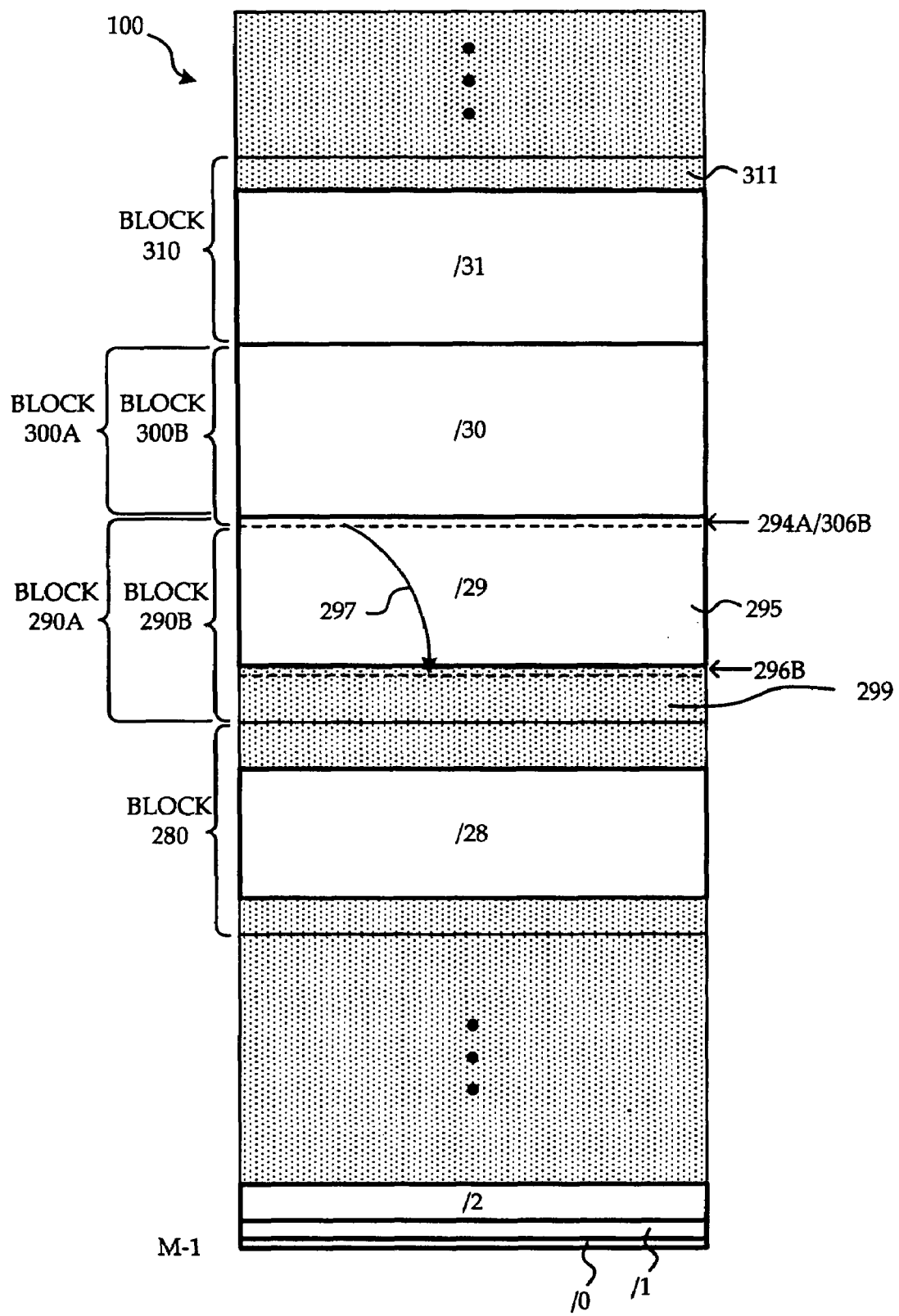
FIG. 7 is a block diagram illustrating an add operation into a full block according to the fast adaptive sorting of a routing table in a TCAM of the preferred embodiment of the invention.

A second situation is depicted by FIG. 7, in which there are no entries adjacent to the /30 block 300A which are empty but in which the neighboring blocks, the /31 block 310 and the /29 block 290A, have empty entries. The neighboring /31 block 310 has empty entries in its lower empty portion 311, while the neighboring /29 block 290A has empty entries in its upper empty portion 299. To add an entry to the /30 block 300A, the neighboring blocks are analyzed by the table manager to see which one has the largest number of empty spaces. The block with the largest number of empty spaces, namely the /29 block 290A, has an entry adjacent the /30 block 300A, namely, the lowest non-empty entry 294A of the used portion 295 of the /29 block 290A. The table manager moves 297 this lowest non-empty entry 294A to the empty space 299 of the /29 block 290B, just adjacent the used portion 295 creating a new highest non-empty entry 296B of the /29 block 290B. The new entry to be added to the /30 block 300A is then inserted into the entry formerly being the lowest non-empty entry 294A becoming the highest non-empty entry 306B of the /30 block 300B.

Figure 8:
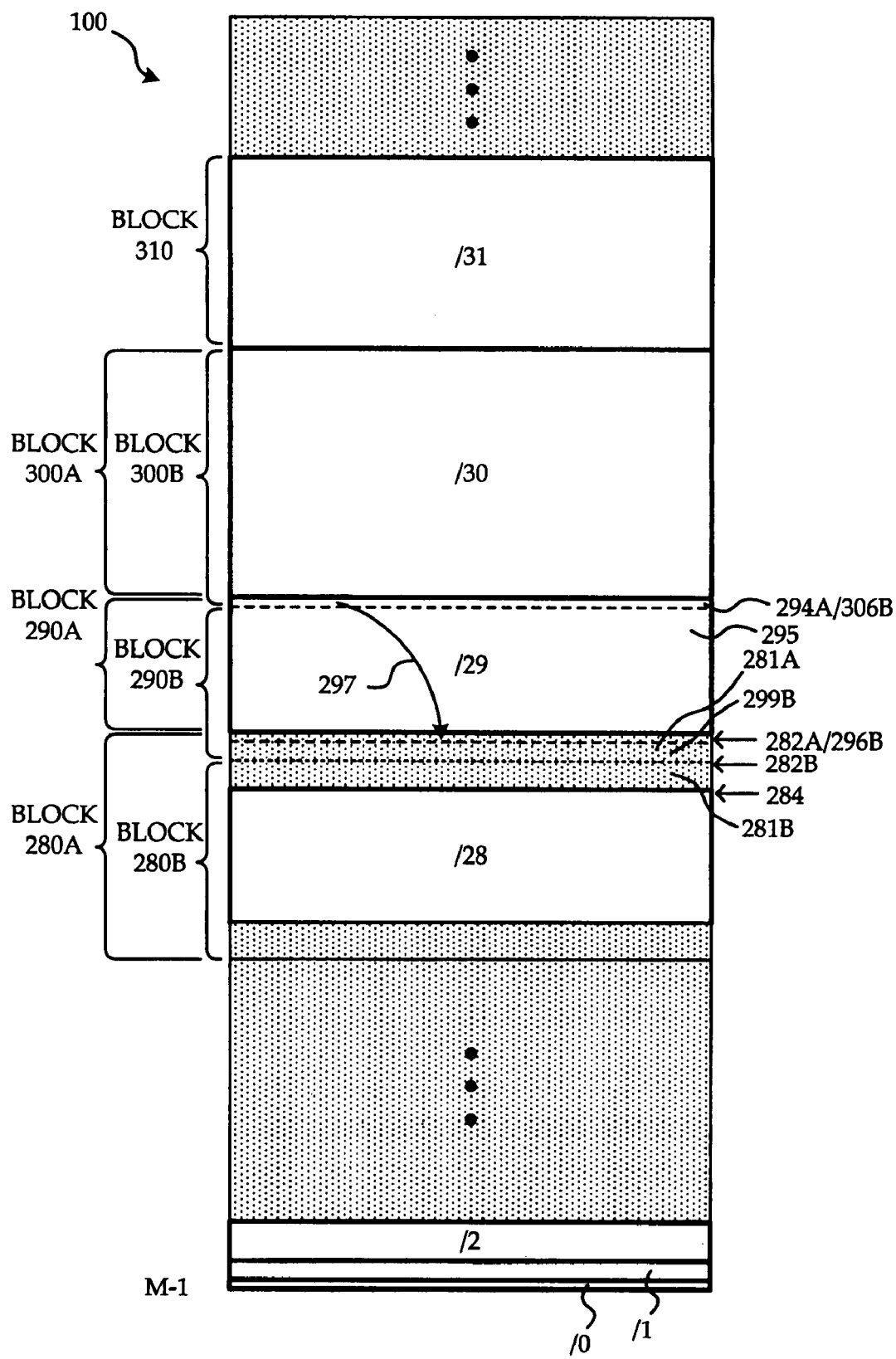
FIG. 8 is a block diagram illustrating an add operation into a full block having a full neighboring block according to the fast adaptive sorting of a routing table in a TCAM of the preferred embodiment of the invention.

A third situation is depicted in FIG. 8, in which there are no entries adjacent to the /30 block 300A which are empty, and in which the neighboring blocks, namely the /29 block 290A and the /31 block 310, are each full. The neighboring block which has the greatest adjacent empty space, which in this case is the /29 block 290A, is used to obtain space from its neighboring block which is the /28 block 280A. Half of the adjacent empty space, which is the lower empty space 281A of the /28 block 280A, is taken by the /29 block 290A becoming newly acquired upper empty space 299B. The minimum TCAM entry 282B for the new /28 block 280B is the TCAM entry which was formerly in the middle of what was the lower empty portion 281A of the old /28 block 280A. The lowest non-empty entry 294A of the used portion 295 of the /29 block 290A is moved 297 to the newly acquired empty space 299B becoming a new highest non-empty entry 296B of the /29 block 290B. The new entry for the /30 block 300 is then added into the entry formerly being the lowest non-empty entry 294A becoming the highest non-empty entry 306B of the /30 block 300B.

In the case that the neighboring block's neighboring block is also full, the process continues by repeated application of the method as described above, to search for the greatest empty space, the least number of blocks away. In this manner an empty space may not be found any closer than three, four or more blocks away from the block into which the new entry is being inserted.

Figure 9:
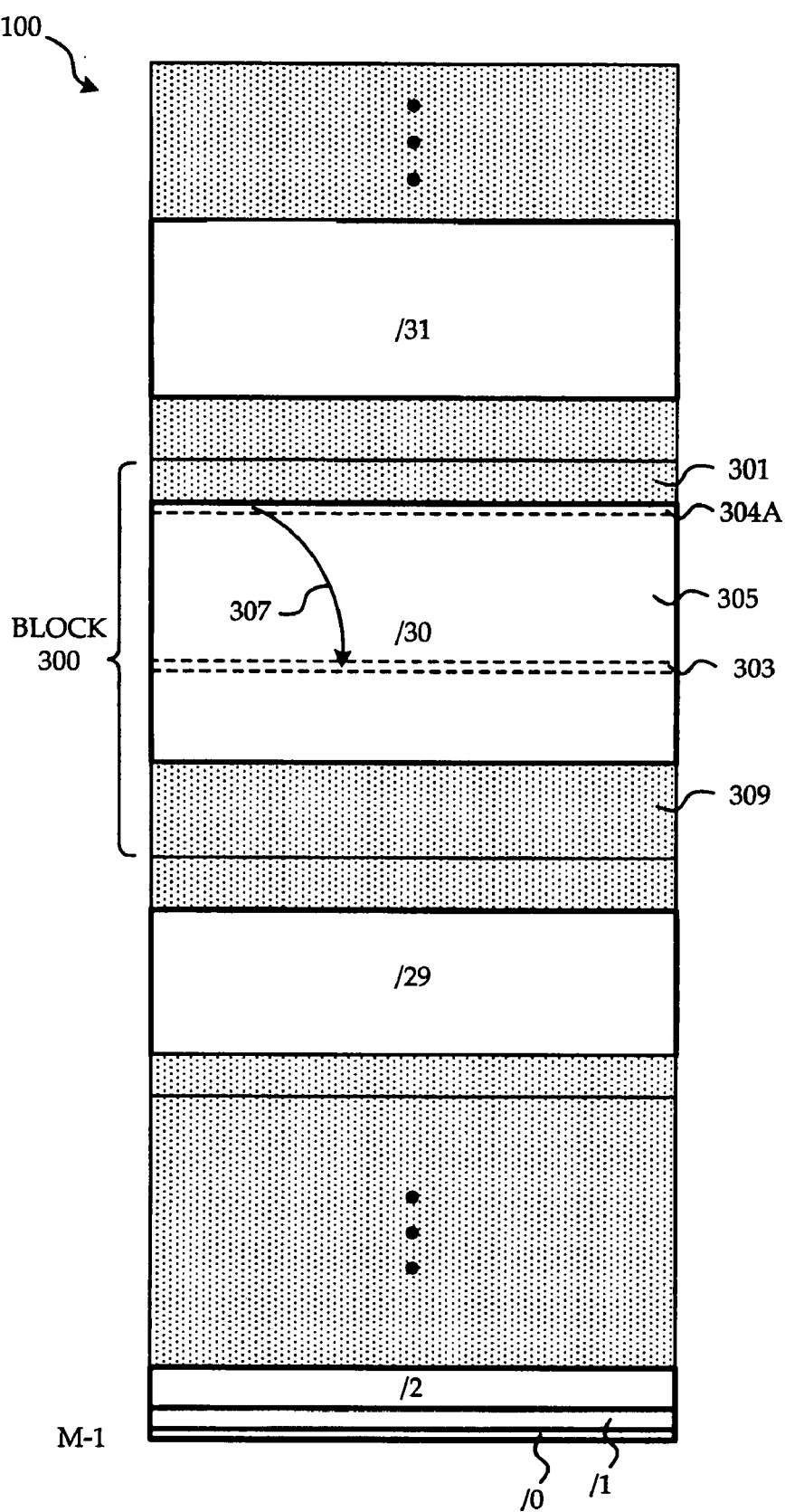
FIG. 9 is a block diagram illustrating a delete operation according to the fast adaptive sorting of a routing table in a TCAM of the preferred embodiment of the invention.

FIG. 9 shows deletion of an entry in the TCAM 100. Here an entry to be deleted 303 is removed from the /30 block 300. To fill the used portion 305, the table manager shifts an entry of the used portion 305 adjacent the empty portion 301, 309 of the /30 block 300 having the smallest number of empty entries to the empty space left by the entry deleted 303. In this case, empty portion 301 has the smallest number of empty entries and hence, the lowest non-empty entry 304A adjacent the empty portion 301 is shifted to the empty space left by the deleted entry 303. Shifting used entries adjacent the smaller of the two empty portions causes centering of the used portion 305 within the /30 block 300 as entries are deleted. In the case that the entry being deleted is on the edge of the used portion 305, then there is no need to shift any entry to fill the empty space.

FIG. 10 shows an example of a real-world distribution of routing entry percentages in a core IPv4 internet routing table by prefix length. The routing table is populated, by a majority of 55.59 percent of the total routing entries, with routing entries having prefix bit lengths of 24. The routing table is also populated at 8.46 percent with routing entries having prefix lengths of 23. In a starting configuration according to the invention with use of this real-world data, a /23 block would be set to have a starting size equal to about 8.46 percent of the table size for routing entries and a /24 block would be set to have a starting size equal to about 55.59 percent.

If for some reason a routing table of the preferred embodiment were not initialized in accordance with real-world statistical distributions of routing entries by prefix length, the routing table would nevertheless adapt as entries are added or deleted according to the embodiment, to reflect the actual statistical distribution of routing entries by prefix-length. This is because blocks which receive a relatively larger percentage of entries will grow and take entries from blocks which receive a lower percentage of entries. While entries are being added and deleted, each used portion of each block will gradually move to its center, and each block will take on a size reflecting a proportion of entries it holds. In this manner the block sizes will eventually reach ideal sizes for the real-world network activity the table is working with, and there will be fewer operations for the table manager to take since blocks will tend not to grow or shrink. As the table fills up, it will do so in a manner proportional to the statistical distribution of prefix lengths. Consequently, in the limit of the table becoming full, it will have the proper block sizes, and will require few if any block size modifications. A routing table according to the invention which has been initialized or has adapted to the real world distribution of routing entries by prefix length can have a worst case number of average moves to add or delete an entry, in the limit of the table becoming full, of barely more than 1.

Although the embodiments presented herein have been described in the context of IPv4, the principles of the embodiments are equally applicable to IPv6, in which case, instead of 33 logical blocks, 129 logical blocks would be used, and instead of there being prefix lengths of 0 to 32 bits, there would be prefix lengths of 0 to 128 bits. It follows that the block at the beginning of the TCAM 100 would be the /128 block having 128-bit prefix summary addresses.

Although the preferred embodiment was described in terms of a routing table having only summary IP addresses as entries, another embodiment could utilize a routing table including routing entries having other types of information. For example in the context of VPNs, (virtual private networks) every destination IP address also includes a VPN ID (identification number). A VPN ID of 0 would indicate the public Internet. In this case the VPN ID is concatenated onto the beginning of every summary IP address in the routing table for the purpose of matching. The VPN ID does not affect the manner in which the table is sorted or the operation of the TCAM because it simply tags along.

The preferred embodiments are not limited in respect of any specific TCAM size which in general is dependent upon the application of the router in which it is used.

Although not specifically illustrated and described above, it should be understood that the process described above is equally suited to an application involving unicast or multicast routes.

The embodiments presented are exemplary only and persons skilled in the art would appreciate that variations to the embodiments described above may be made without departing from the spirit of the invention. The scope of the invention is solely defined by the appended claims.

We claim:

1. A method of managing a routing table of a Ternary Content Addressable Memory (TCAM) for longest IP prefix matching, the method comprising:

dividing the routing table into a plurality of logical blocks wherein each logical block is associated with a respective IP prefix length and is for storing respective routing entries having said respective IP prefix length, and wherein each logical block is of a respective size whose proportion to a total size of the routing table is determined by the respective IP prefix length, and wherein said plurality of logical blocks are ordered in said routing table such that the TCAM returns a longest IP prefix match when passed an IP address; and adding a routing entry to a logical block of said plurality of logical blocks of said table, the step of adding comprising:

inserting the routing entry into the center of the logical block if the logical block is empty, inserting the routing entry into an empty entry adjacent to a used portion of the logical block on a side of the used portion which has a greatest number of empty entries, if the logical block has non-empty entries and empty entries, and growing the logical block into an adjacent empty portion of a neighboring logical block, if the logical block is full, and inserting the routing entry into said adjacent empty portion in an empty entry adjacent to a used portion of the logical block.

2. A method of managing a routing table of a TCAM according to claim 1 wherein said proportion for each respective size of each logical block is determined by the respective IP prefix length, by being initialized to an expected proportion of non-empty routing entries of said IP prefix length to a total number of non-empty routing entries in the routing table during operation.

3. A method of managing a routing table of a TCAM according to claim 1 wherein said proportion for each respective size of each logical block is determined by the respective IP prefix length, by being changed in accordance with an actual proportion of non-empty routing entries of said IP prefix length to a total number of non-empty routing entries in the routing table during operation.

4. A method of managing a routing table of a TCAM according to claim 1, wherein the adjacent empty portion of the neighboring logical block is larger than a second adjacent empty portion, if any, of a second neighboring logical block, if any, and wherein half of said adjacent empty portion is taken by said logical block in said growing of the logical block.

5. A method of managing a routing table of a TCAM according to claim 1, wherein adding a routing entry to a logical block of said plurality of logical blocks of said table further comprises:
if there is no adjacent empty portion in said neighboring logical block before said step of growing, creating said adjacent empty portion by shifting an adjacent neighboring routing entry of said neighboring logical block to a second empty portion of said neighboring logical block.

6. A method of managing a routing table of a TCAM according to claim 5 wherein the second empty portion of said neighboring logical block is larger than a third empty portion, if any, of a second neighboring logical block, if any.

7. A method of managing a routing table of a TCAM according to claim 5 wherein adding a routing entry to a logical block of said plurality of logical blocks of said table further comprises:
if there is no second empty portion in said neighboring logical block before said step of creating said adjacent empty portion, creating said second empty portion by growing the neighboring logical block into a further adjacent empty portion of a further neighboring logical block.

8. A method of managing a routing table of a TCAM according to claim 1, further comprising:
deleting a routing entry to be deleted from said logical block of said plurality of logical blocks of said table, the step of deleting comprising:
copying a non-empty routing entry, from a used portion of said logical block and adjacent to an empty portion of said logical block, over said routing entry to be deleted; and
clearing said non-empty routing entry creating an empty entry.

9. A method of managing a routing table of a TCAM according to claim 8 wherein the empty portion of said logical block is larger than a second empty portion, if any, of said logical block.

10. A system for routing IP packets according to longest IP prefix matching, the system comprising:
a Ternary Content Addressable Memory (TCAM) having a routing table for longest IP prefix matching; and
a table manager for:
dividing the routing table into a plurality of logical blocks wherein each logical block is associated with a respective IP prefix length,
storing respective routing entries having said respective IP prefix length, wherein each logical block is of a respective size whose proportion to a total size of the routing table is determined by the respective IP prefix length, and
adding a routing entry to a logical block of said plurality of logical blocks of said table by:
inserting the routing entry into the center of the logical block if the logical block is empty,
inserting the routing entry into an empty entry adjacent to a used portion of the logical block on a side of the used portion which has a greatest number of empty entries, if the logical block has non-empty entries and empty entries, and
growing the logical block into an adjacent empty portion of a neighboring logical block, if the logical block is full, and inserting the routing entry into said adjacent empty portion in an empty entry adjacent to a used portion of the logical block,
wherein said plurality of logical blocks are ordered in said routing table such that the TCAM returns a longest IP prefix match when passed an IP address.

11. A system for routing IP packets according to longest IP prefix matching according to claim 10 wherein said proportion for each respective size of each logical block is determined by the respective IP prefix length, by being initialized by said table manager to an expected proportion of non-empty routing entries of said IP prefix length to a total number of non-empty routing entries in the routing table during operation.

12. A system for routing IP packets according to longest IP prefix matching according to claim 10 wherein said proportion for each respective size of each logical block is determined by the respective IP prefix length, by being changed by said table manager in accordance with an actual proportion of non-empty routing entries of said IP prefix length to a total number of non-empty routing entries in the routing table during operation.

13. A system for routing IP packets according to longest IP prefix matching according to claim 10, wherein the adjacent empty portion of the neighboring logical block is larger than a second adjacent empty portion, if any, of a second neighboring logical block, if any, and wherein half of said adjacent empty portion is taken by said logical block in said growing of the logical block.

14. A system for routing IP packets according to longest IP prefix matching according to claim 10, wherein said table manager is further for adding a routing entry to a logical block of said plurality of logical blocks of said table by:
if there is no adjacent empty portion in said neighboring logical block before said step of growing, creating said adjacent empty portion by shifting an adjacent neighboring routing entry of said neighboring logical block to a second empty portion of said neighboring logical block.

15. A system for routing IP packets according to longest IP prefix matching according to claim 14 wherein the second empty portion of said neighboring logical block is larger than a third empty portion, if any, of a second neighboring logical block, if any.

16. A system for routing IP packets according to longest IP prefix matching according to claim 14 wherein said table manager is further for adding a routing entry to a logical block of said plurality of logical blocks of said table by:

if there is no second empty portion in said neighboring logical block before said step of creating said adjacent empty portion, creating said second empty portion by growing the neighboring logical block into a further adjacent empty portion of a further neighboring logical block.

17. A system for routing IP packets according to longest IP prefix matching according to claim 10, wherein said table manager is for deleting a routing entry to be deleted from said logical block of said plurality of logical blocks of said table by:
   copying a non-empty routing entry, from a used portion of said logical block and adjacent to an empty portion of said logical block, over said routing entry to be deleted; and
   clearing said non-empty routing entry creating an empty entry.

18. A system for routing IP packets according to longest IP prefix matching according to claim 17 wherein the empty portion of said logical block is larger than a second empty portion, if any, of said logical block.

19. A system for routing IP packets according to longest IP prefix matching according to claim 17 wherein each logical block associated with a small IP prefix length has an initial size of two to the power of the prefix length.

20. A system for routing IP packets according to longest IP prefix matching according to claim 17 wherein logical blocks associated with medium IP prefix lengths have a majority of entries.

21. A system for routing IP packets according to longest IP prefix matching according to claim 20 wherein the IP packets IPv4 packets, and wherein an expected proportion of non-empty routing entries having an IP prefix length of 24 to a total number of non-empty routing entries in the routing table during operation is greater than 50 percent.

* * * * *